US007636712B2

(12) United States Patent
Larimore et al.

(10) Patent No.: US 7,636,712 B2
(45) Date of Patent: Dec. 22, 2009

(54) BATCHING DOCUMENT IDENTIFIERS FOR RESULT TRIMMING

(75) Inventors: Stefan Larimore, Redmond, WA (US); Mihai Petriuc, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/600,307

(22) Filed: Nov. 14, 2006

(65) Prior Publication Data

US 2008/0114730 A1 May 15, 2008

(51) Int. Cl.
*G06F 17/30* (2006.01)
(52) U.S. Cl. .................. 707/3; 707/4; 707/5; 707/10; 707/104.1
(58) Field of Classification Search .......... 707/3–6, 707/104.1, 10
See application file for complete search history.

(56) References Cited

U.S. PATENT DOCUMENTS

| | | | | |
|---|---|---|---|---|
| 4,769,772 | A | 9/1988 | Dwyer | 364/300 |
| 4,811,207 | A | 3/1989 | Hikita et al. | 364/200 |
| 5,121,494 | A | 6/1992 | Dias et al. | 395/600 |
| 5,335,345 | A | 8/1994 | Frieder et al. | 395/600 |
| 5,446,886 | A | 8/1995 | Li | 395/600 |
| 5,542,073 | A | 7/1996 | Schiefer et al. | 395/600 |
| 5,822,747 | A | 10/1998 | Graefe et al. | 707/2 |
| 5,913,208 | A * | 6/1999 | Brown et al. | 707/3 |
| 6,009,442 | A * | 12/1999 | Chen et al. | 715/205 |
| 6,032,144 | A | 2/2000 | Srivastava et al. | 707/3 |
| 6,237,011 | B1 * | 5/2001 | Ferguson et al. | 715/234 |
| 6,345,267 | B1 | 2/2002 | Lohman et al. | 707/2 |
| 6,360,215 | B1 * | 3/2002 | Judd et al. | 707/3 |
| 6,449,609 | B1 | 9/2002 | Witkowski | 707/4 |
| 6,898,592 | B2 * | 5/2005 | Peltonen et al. | 707/3 |
| 7,287,025 | B2 * | 10/2007 | Wen et al. | 707/5 |
| 7,428,528 | B1 * | 9/2008 | Ferrari et al. | 707/3 |
| 7,567,957 | B2 * | 7/2009 | Ferrari et al. | 707/3 |
| 2002/0065814 | A1 * | 5/2002 | Okamoto et al. | 707/3 |
| 2006/0101004 | A1 * | 5/2006 | Matsubayashi et al. | 707/3 |

OTHER PUBLICATIONS

Jarke et al.; "Query Optimization in Database Systems"; Computing Surveys, vol. 16, No. 2., Jun. 1984; 42 pgs.
Ming-Syan Chen et al., "Combining Join and Semi-Join Operations for Distributed Query Processing"; 1993 IEEE; pp. 534-542.
Nie et al.; "Joint Optimization of Cost and Coverage of Query Plans in Data Integration"; Appeared in Proc. CIKM 2001; pp. 223-230.

* cited by examiner

*Primary Examiner*—Don Wong
*Assistant Examiner*—Hanh B Thai
(74) *Attorney, Agent, or Firm*—Merchant & Gould P.C.

(57) ABSTRACT

A query is separated into subqueries including a first subquery containing terms applicable to a first data store and a second subquery containing terms applicable to a second data store, where both data stores maintain information regarding the documents. Applying the first subquery to the first data store retrieves a first list of document identifiers associated with documents that satisfy the terms of the first subquery. The first list is combined with the second subquery to form a masked subquery, which is applied to the second data store. The masked subquery only seeks to identify document identifiers that both are included the first list and that satisfy terms of the second query. The document identifiers included in the first list may be ordered to match an order in which the document identifiers are ordered in the second data store.

9 Claims, 16 Drawing Sheets

BATCHING DOCUMENT IDENTIFIERS FOR RESULT TRIMMING

BACKGROUND

Across the Internet, within organizations, and in other areas, users increasingly rely on networked servers to provide access to information. Because of the volume of information that must be stored and monitored, users typically will access multiple servers to find and retrieve a document. For example, in an Internet search, a user will be directed to one or more servers to search indices that may help identify relevant documents. Once the documents have been identified, the user will follow a link to one or more other servers to retrieve the document.

Users similarly may access multiple servers within an organizational network to retrieve documents or other information within businesses, universities, government entities, and other organizations. Because of the massive numbers of documents and other types of data that may be stored in such networks, users may access one or more servers to identify the information they seek, and access other servers to retrieve the documents and information sought.

In both types of contexts, it is desirable to reduce the demand placed on the individual servers in processing queries for documents. In addition, it is desirable to reduce the network communications traffic involved in executing the search to identify relevant documents and other data.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to computer-implemented methods and computer-readable media storing instructions for reducing the breadth of queries and reducing network traffic between servers when a query is processed by multiple servers. Specifically, when a query has to be processed against multiple stores of information, a front-end server divides the query into subqueries. A first subquery is applied to a first data store maintaining information about the body of documents being queried. Results from the first subquery are then appended to a second subquery to create a masked subquery, such that the second subquery is applied to documents listed in the results of the first subquery in the second data store maintaining information about the documents. As a result, the second subquery is checked against a reduced number of entries, saving processing time and trimming or reducing a number of document identifiers that will be yielded by the processing of the second subquery.

One implementation includes a computer-implemented method for processing a query for identifying one or more desired documents from among a plurality of documents. A query is separated into subqueries including a first subquery containing terms applicable to a first data store and a second subquery containing terms applicable to a second data store, where both data stores maintain information regarding the documents. Applying the first subquery to the first data store retrieves a first list of document identifiers associated with documents that satisfy the terms of the first subquery. The first list is combined with the second subquery to form a masked subquery that is applied to the second data store. The masked subquery only seeks to identify document identifiers that both are included the first list and that satisfy terms of the second query. The document identifiers included in the first list may be ordered to match an order in which the document identifiers are ordered in the second data store.

In another implementation, a computer-implemented method forms a message to communicate a query to a data store to selectively identify a portion of a plurality of documents for which the data store maintains information regarding each of the plurality of documents. The information maintained includes an associated document identifier and associated descriptive information. Forming the message includes specifying at least one condition the associated descriptive information must satisfy for each of the plurality of documents to be identified by the query. In addition, a document identifier list is specified that includes a plurality of document identifiers restricting the query. As a result, only a document having associated descriptive information satisfying the condition and an associated document identifier included in the document identifier list satisfies the query.

In another implementation, a computer-implemented method assembles a plurality of nodes to form a query message to present to a data store to selectively identify a portion of a plurality of documents for which the data store maintains an associated document identifier and associated descriptive information for each of the plurality of documents. At least one conditional node is presented including a restriction operable to selectively identify documents according to the information maintained by the data store and a node type indicating how the restriction is to be applied to the information to specify a condition a document must satisfy to be selectively identified by the query. In addition, a document identifier node is presented that includes a plurality of document identifier restriction, a document identifier node type, and a document identifier count specifying a number of document identifier restrictions included in the document identifier node. Each of the nodes may include a weight indicating an importance of the node relative to other nodes included in the query message. The query message may be a variable length message. The document identifier restrictions may be ordered to present them in an order in which the document identifiers in the data store are ordered.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like elements. In addition, the first digit in three-digit reference numerals and the first two-digits in four-digit reference numerals refer to the figure in which the referenced element first appears.

DETAILED DESCRIPTION OF IMPLEMENTATIONS

This detailed description describes implementations of processing queries using subqueries and lists or batches of document identifiers to reduce processing demands and network traffic between multiple data stores used in processing the queries, as well as implementations of forming query messages to include document identifiers.

Illustrative Operating Environment

Figure 1:
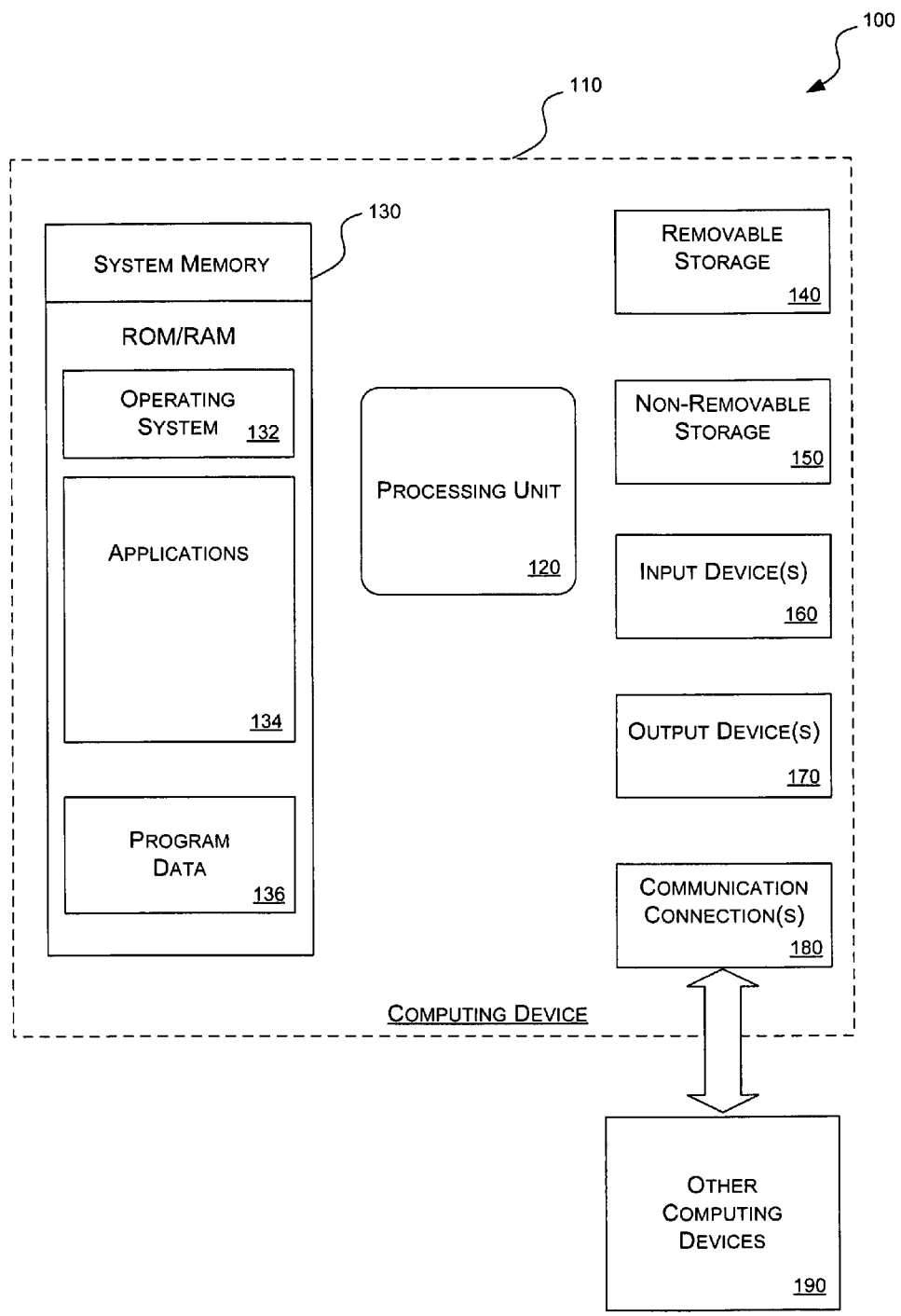
FIG. 1 is a block diagram of an operating environment for implementations of computer-implemented methods and user interfaces as herein described.

Implementations of batching document identifiers to trim query results may be supported by a number of computing devices communicating over a network. FIG. 1 is a block diagram of a representative operating environment 100.

Referring to FIG. 1, an exemplary operating environment 100 includes a computing device, such as computing device 110. In a basic configuration, computing device 110 may include a stationary computing device or a mobile computing device. Computing device 110 typically includes at least one processing unit 120 and system memory 130. Depending on the exact configuration and type of computing device, system memory 130 may be volatile (such as RAM), non-volatile (such as ROM, flash memory, and the like) or some combination of the two. System memory 130 typically includes operating system 132, one or more applications 134, and may include program data 136.

Computing device 110 may also have additional features or functionality. For example, computing device 110 may also include additional data storage devices (removable and/or non-removable) such as, for example, magnetic disks, optical disks, or tape. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. System memory 130, removable storage 140 and non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 110. Any such computer storage media may be part of device 110. Computing device 110 may also have input device(s) 160 such as a keyboard, mouse, pen, voice input device, touch input device, etc. Output device(s) 170 such as a display, speakers, printer, etc. may also be included.

Computing device 110 also contains communication connection(s) 180 that allow the device to communicate with other computing devices 190, such as over a network or a wireless network. Communication connection(s) 180 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Processing Queries by Batching Document Identifiers

Figure 2:
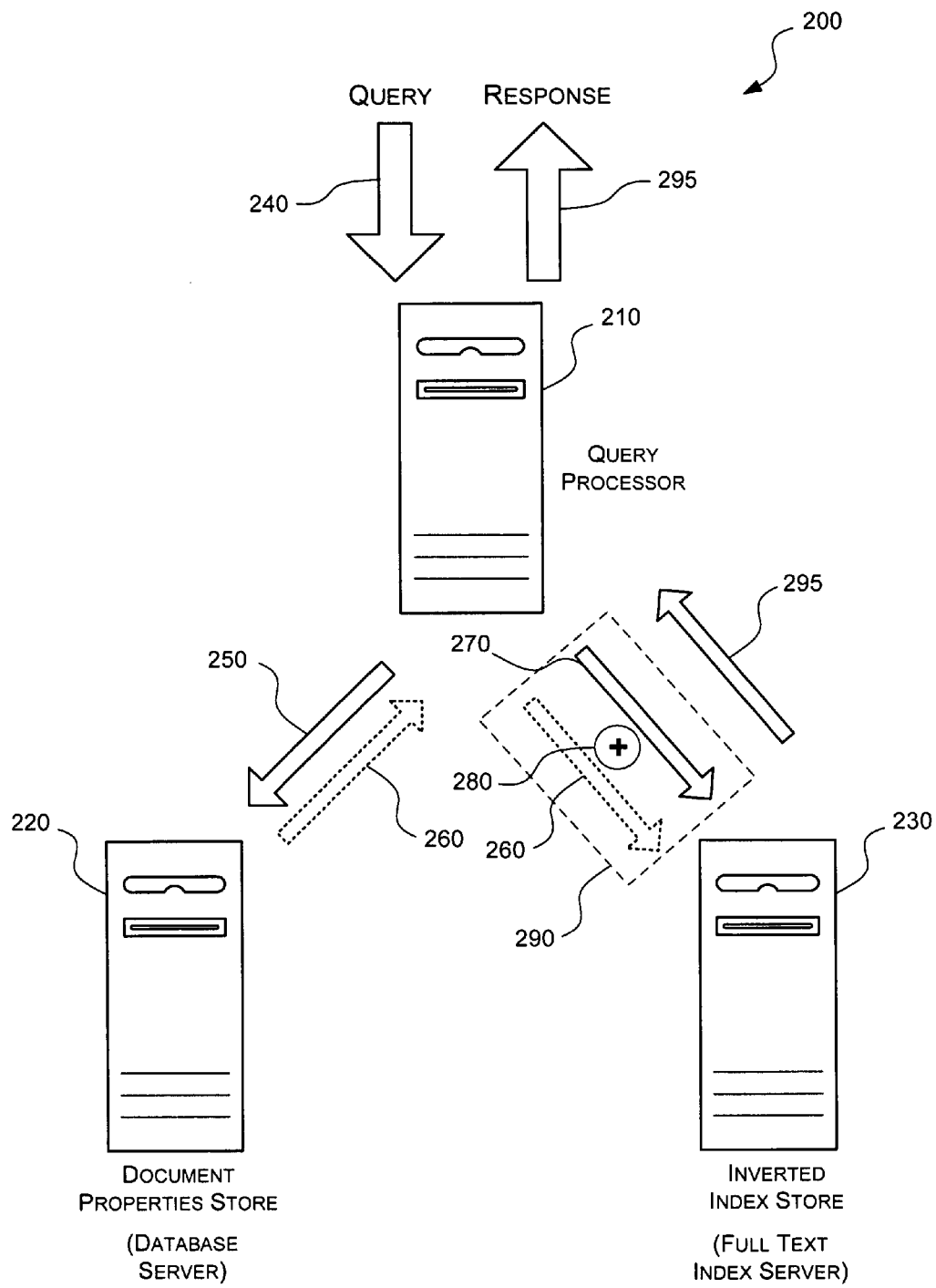
FIGS. 2 and 3 are functional block diagrams illustrating using subqueries and batching of document identifiers to process queries.
Figure 3:
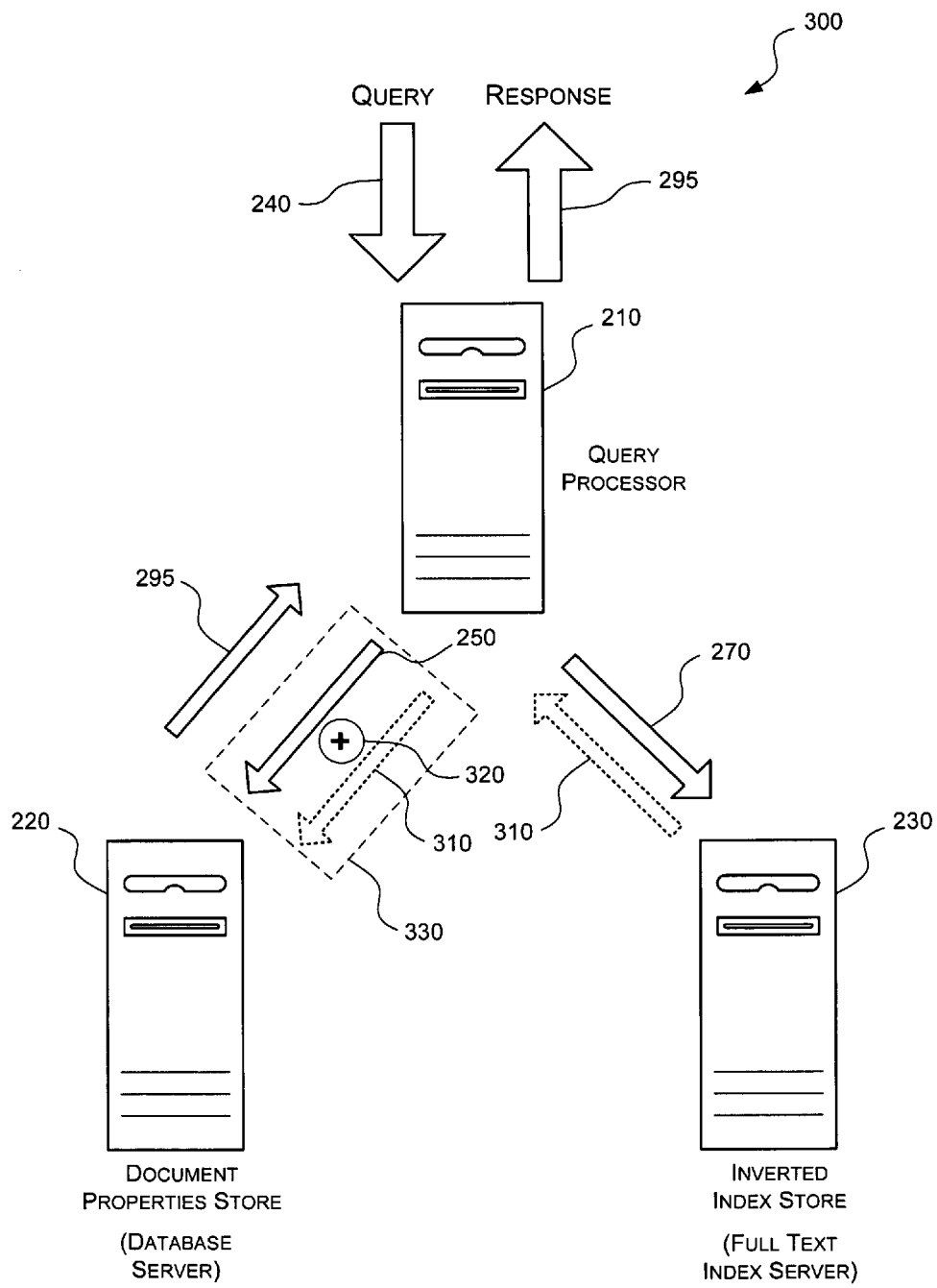

FIGS. 2 and 3 provide overviews of methods of trimming results by using subqueries and batching document identifiers between servers. FIG. 2 shows a query processing environment 200 in which queries are processed by three different servers: a query processor 210, such as a web front-end processor, a document properties store 220, and an inverted index store 230. The document properties store 220 maintains tables, such as a structured query language (SQL) database that lists document properties such as author name, creation date, last modification date, and other properties for each of the plurality of documents tracked by the inverted index store 230. The inverted index store 230 provides for full text searching as a result of indices compiled by crawling or otherwise mining a plurality of documents to build a list of words contained in those documents and lists of documents that contain each of those words. Both the document properties store 220 and the inverted index store 230 maintain information about the same body of documents; however, the two servers 220 and 230 maintain different information about the documents.

In some document server arrangements, a document properties store and an inverted index store may be maintained on the same server or clustered group of servers. However, in a system where many documents are to be tracked, maintaining both the inverted index store and the document properties store on a single system may be undesirable or impractical. For example, there may be efficiencies to be gained by maintaining an SQL database to maintain the document properties store on one server while dedicating another server to supporting an inverted index store. Specifically, in an implementation of Microsoft® Office 2007, offered by Microsoft Corporation of Redmond, Wash., using a server configuration having a separate document properties store and a separate index store is considered desirable to facilitate document retrieval for large numbers of documents.

Referring to FIG. 2, the query processor 210 receives a query 240, and divides the query into two subqueries: a document properties store subquery 250 and an inverted index store subquery 270. The document properties store subquery 250 includes those attributes of the query 240 that involve creation or usage of the documents, such as the author, the creation date, the last modification date, and similar types of information. The inverted index store subquery 270 includes those attributes of the query 240 that involve identifying documents using particular words or phrases used in the substance of the documents. These attributes are described in more detail with reference to FIGS. 4-10.

According to one implementation of result trimming by batching document identifiers, the document properties store subquery 250 is first submitted to the document properties store 220. The document properties store 220 identifies a first list of document identifiers 260 indicating which documents satisfy one or more conditions included in the document properties store subquery 250. In other words, the first list of document identifiers 260 represents the results of the document properties store subquery 250.

The results of the first subquery are returned to the query processor 210. Then, the query processor combines the first list of documents 260 with the inverted index store subquery 270. In one implementation, this combination is represented by a logical AND 280 of the first list of documents 260 and the inverted index store subquery 270. As a result, the query processor 210 passes a masked subquery 290 to the inverted index store 230. The masked subquery 290 requests the document identifiers of all documents within the first list of documents 260 previously identified that also satisfy one or more conditions specified by the inverted index store subquery 270. The results 295 of the application of the masked subquery 295 returned by the document properties store 230 represent the overall response to the query 240.

It should be noted that in the example of FIG. 2, as well as in the examples that follow, the document identifiers retrieved or identified in a first search are combined with a subsequent subquery using a logical AND to form the masked subquery. However, the document identifiers may be combined with the subsequent subquery in other ways, such as by a logical OR, a logical exclusive "OR" or "not AND" ("NAND"), or other connectors.

Two advantages of this implementation of result trimming are evident from FIG. 2. First, in processing the masked subquery 290, the inverted index store 230 processes the inverted index store subquery 270 against only a subset of the information maintained by the inverted index store 230 because the inverted index store subquery 270 is processed only against entries corresponding with document identifiers in the first list 260. This saves processing time by not requiring the inverted index store 230 to process what might be numerous conditions for every document tracked by the inverted index store 230. Second, the quantity of data included in the results 295 of the application of the masked subquery 290 is likely to be smaller than would be the results of the application of the inverted index store subquery 270. The results 295 are trimmed by the application of the first list of document identifiers 260 and thus represent a subset of the results that may have resulted from application of the inverted index store subquery 270 alone. As a result, a lesser quantity of data is transmitted on the network between the servers 210 and 230.

FIG. 2 shows the first list of document identifiers 260 being returned to the query processor 210 where it is combined with the inverted index store subquery 270 to form the masked subquery 290. However, to offload processing from the query processor 210 and reduce data communications traffic between the document properties store 220 and the query processor 210, other implementations may be used. To describe one alternative, for example, after identifying the first list of document identifiers 260, the document properties store 220 could transmit the first list 260 directly to the inverted index store 230. The inverted index store 230 then could combine the first list 260 with the inverted index store subquery 270 to form the masked subquery 290.

As will be further described below, it may not be preferable to process the document properties store subquery 250 as the first subquery in responding to the query 240. For example, if the inverted index store subquery 270 would return fewer document identifiers than the document properties store subquery 250, fewer document identifiers would be transmitted after processing the first subquery and fewer records would have to be processed in response to the second subquery. Thus, it may be preferable to process the inverted index store subquery 270 first, before processing the document properties store subquery 250.

FIG. 3 illustrates an environment 300 and which the query 240 is again separated into a document properties store subquery 250 and an inverted index store subquery 270. However, by contrast with FIG. 2, FIG. 3 illustrates a case in which the inverted index store subquery 270 is processed as a first query. A list of document identifiers 310 identified by the inverted index store 230 is returned to the query processor 210. The query processor 210 combines this first list of document identifiers 310 using a logical AND 320 with the document properties store subquery 250 to form a new masked subquery 330. In response to the new masked subquery 330, the document properties store 220 returns a list of results 295. The list of results 295 includes a list of document identifiers satisfying all the conditions of the query 240 and thus represents the response 295 to the query 240. As previously described, alternatively, the first list 310 may be transmitted directly to the document properties store 250 where it will be combined with the document properties store subquery 250, instead of sending the first list 310 to the query processor 210 for the query processor 210 to combine the first list 310 with the document properties store subquery 250 to form the masked subquery 330.

FIGS. 2 and 3 show that for the same query 240, the document properties store subquery 250, the inverted index store subquery 270, and the response 295 are the same in both environments 200 and 300. This is not surprising because operation of combining the subqueries and/or the resulting list of document identifier with a logical AND is a commutative operation. Accordingly, the order in which the subqueries 250 and 270 of the query 240 are processed can be determined based on which sequence is more efficient in terms of processing and/or data communications considerations, as is further described below.

Logical Description of Processing Queries by Batching Document Identifiers

Figure 4:
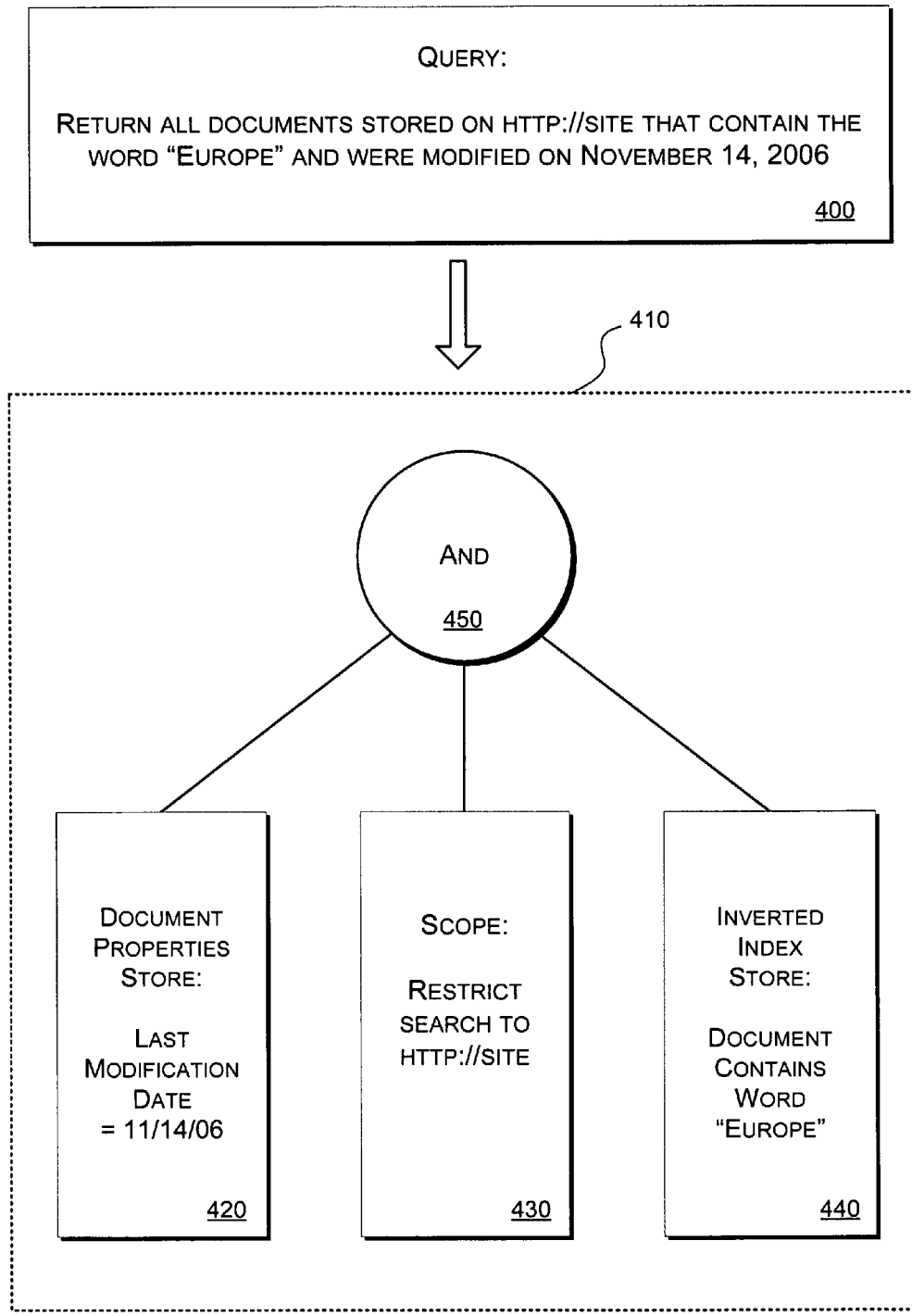
FIGS. 4-10 are logical block diagrams illustrating the use of subqueries and lists of document identifiers to process queries

FIGS. 4-10 further illustrate the separation of a query into subqueries and the processing of those subqueries. FIGS. 4-10 illustrate our query is separated and processed a logical level in the context of an example. The exemplary query 400 used in FIGS. 4-7 is "Return all documents stored on http:// site that contain the word 'Europe' and were modified on Nov. 14, 2006." As FIG. 4 depicts, this simple query can be restated as a logical representation 410 of the original query 400 including three separate components or subqueries: a document properties store subquery 420, a scope restriction 430, and an inverted index store or full text subquery 440. The document properties store subquery 420 specifies a document attribute included in the query 400. In this case, the document attribute seeks documents that were last modified on Nov. 14, 2006. The scope restriction 430 includes that part of the query 400 limiting results to a particular domain or otherwise-specified group of documents, which in this example specifies only documents on "http://site." The inverted index store subquery 440 includes that part of the query 400 that references the substance of the documents, specifically, seeking documents that contain the word "Europe." Combining components 420-440 with a logical AND 450 presents a logical representation 410 of the original query 400.

The scope restriction 430 may restrict the application of the query 400 in different ways. For example, the scope restriction 430 may result in the subqueries 420 and 440 being applied to servers at a different physical location. Alternatively, the scope restriction may restrict the application of the subqueries 420 and 440 to a different logical segment of a server or group of servers. For purposes of this example, it is assumed that the scope restriction 430 designates a logical section of the same server or group of servers.

Figure 5:
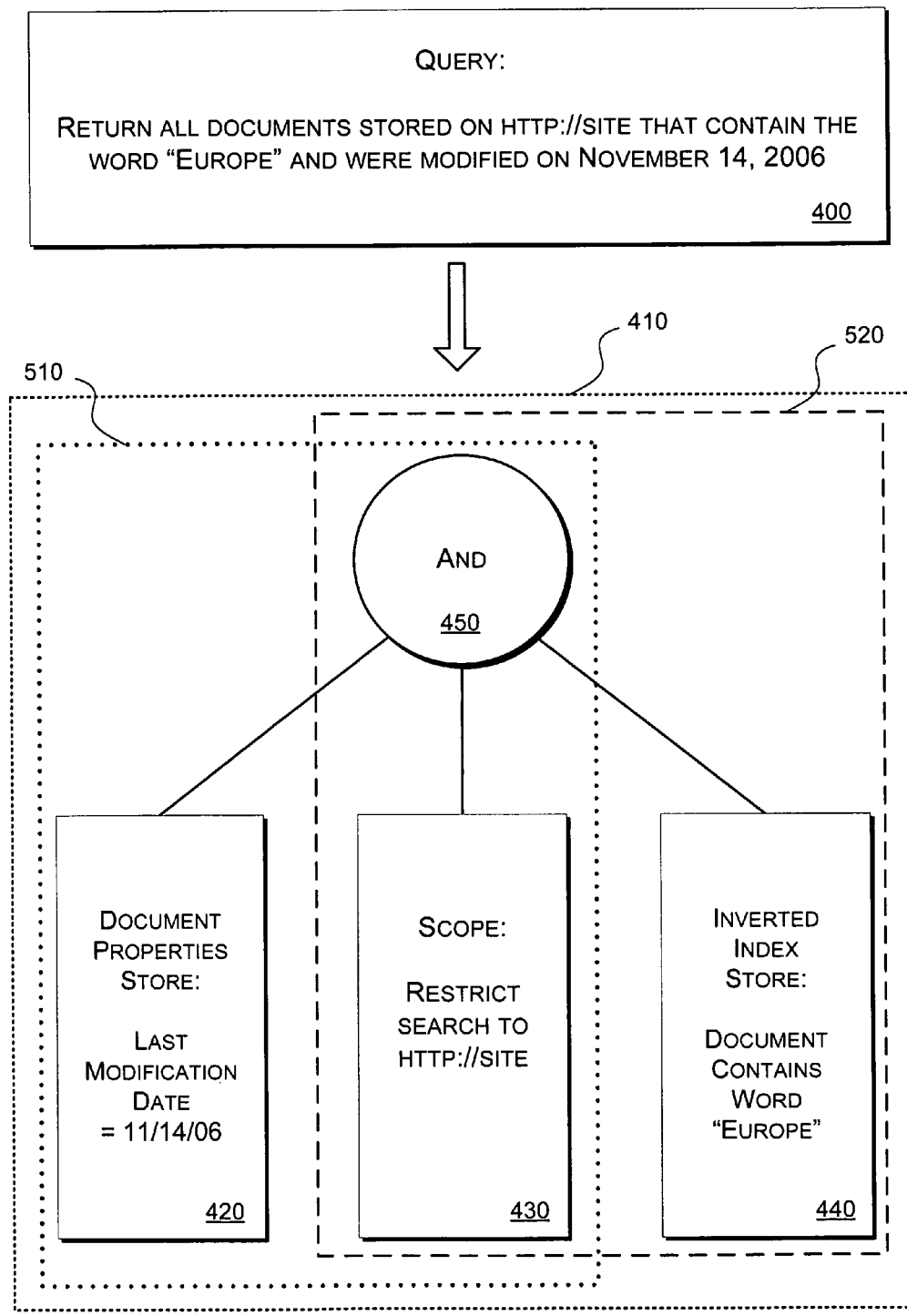

FIG. 5 illustrates how the components 420-440 are grouped into subqueries. A property-based subquery 510 represents a subset of the logical representation 410 of the original query 400. The document property store subquery 420 is combined with the scope restriction 430 with a logical AND 450. Applying the property-based subquery 510 to the document property store will return a list of document identifiers that satisfy the conditions asserted by the elements 420 and 430 of the query 400. Correspondingly, a text-based subquery 520 represents another subset of the logical representation 410 of the original query 400 in which the inverted index store subquery 440 is combined with the scope restriction 430 with a logical AND 450. Applying the text-based subquery 520 to the inverted index store will return a list of document identifiers that satisfy the conditions asserted by the elements 430 and 440 of the query 400.

Figure 6:
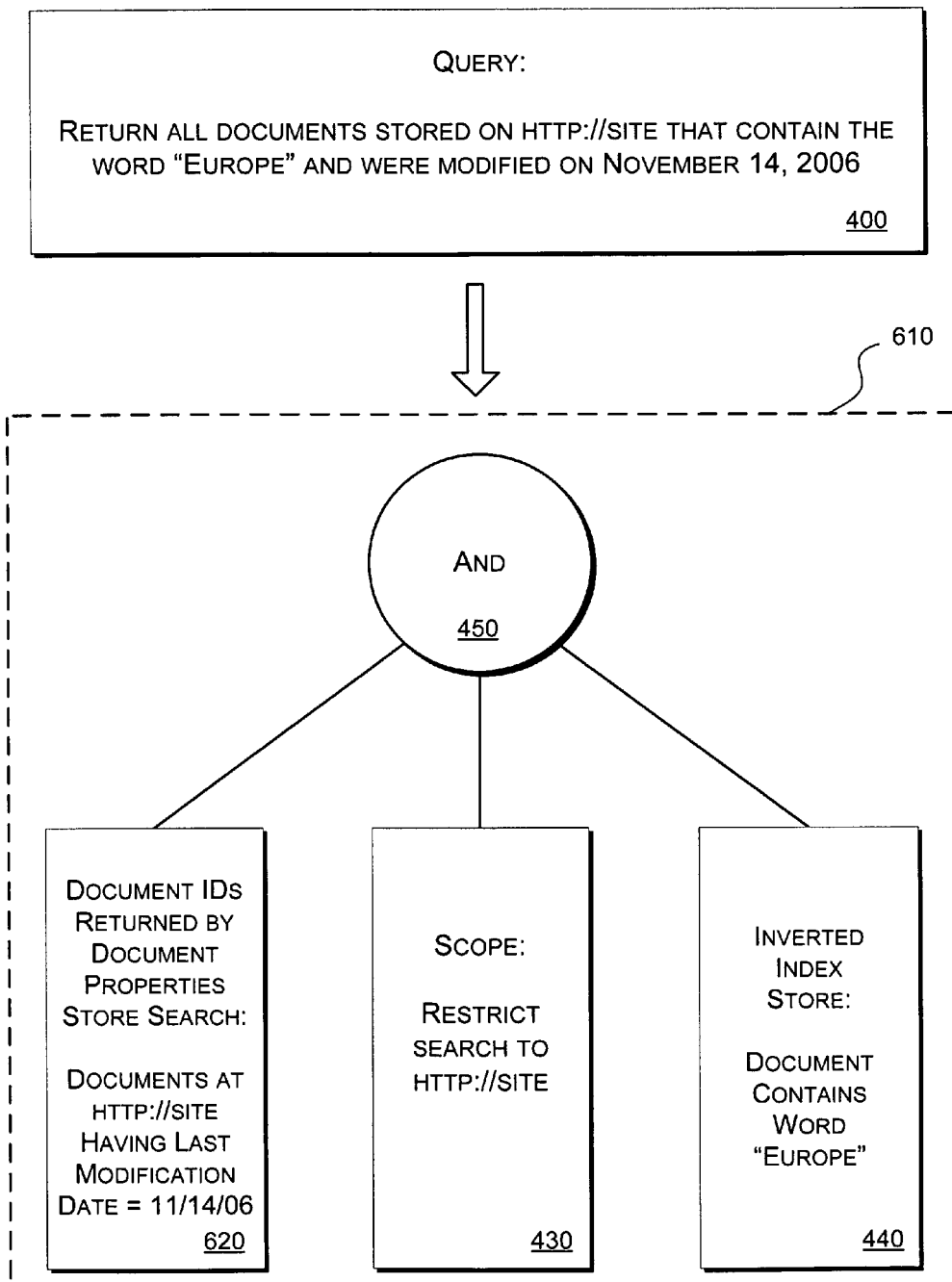

FIG. 6 illustrates a logical reconstitution 610 of the original query 400 based on the grouping of the elements 420-440 illustrated in FIG. 5. As described with reference to FIGS. 2 and 3, applying the property-based subquery 510 of FIG. 5 returns a first list of document identifiers 620 returned by the document properties store including those documents that have a last modification date of Nov. 14, 2006. Logically, the first list of document identifiers 620 is identical to the property-based subquery 510 (FIG. 5). The combination of the first list of document identifiers 620, the scope restriction 430, and the inverted index store subquery 440 combined with a logical and 450 is logically the same as the original query 400. Therefore, the logical reconstitution 610 of the original query 400 can be applied to the inverted index store to obtain the results of the original query 400. In other words, FIG. 6 illustrates that the document identifiers retrieved by the application of a first subquery can be combined with a second subquery which, in turn, is applied to a second data store without changing the overall results. Accordingly, one can obtain the benefits described with reference to FIGS. 2 and 3 in separately processing a query into subqueries and batching document identifiers to trim the results without changing the overall result.

As described with reference to FIG. 3, it may be desirable to execute the text-based subquery 520 (FIG. 5) before executing the property-based subquery 510. As previously described, it may appear that the text-based subquery 520 would retrieve fewer document identifiers than would be retrieved by the property-based subquery 510. Alternatively, because of demands on the respective servers, the inverted index store may be available even though the document properties store is busy, thus, it may be efficient to proceed with the subquery that can be processed first.

Figure 7:
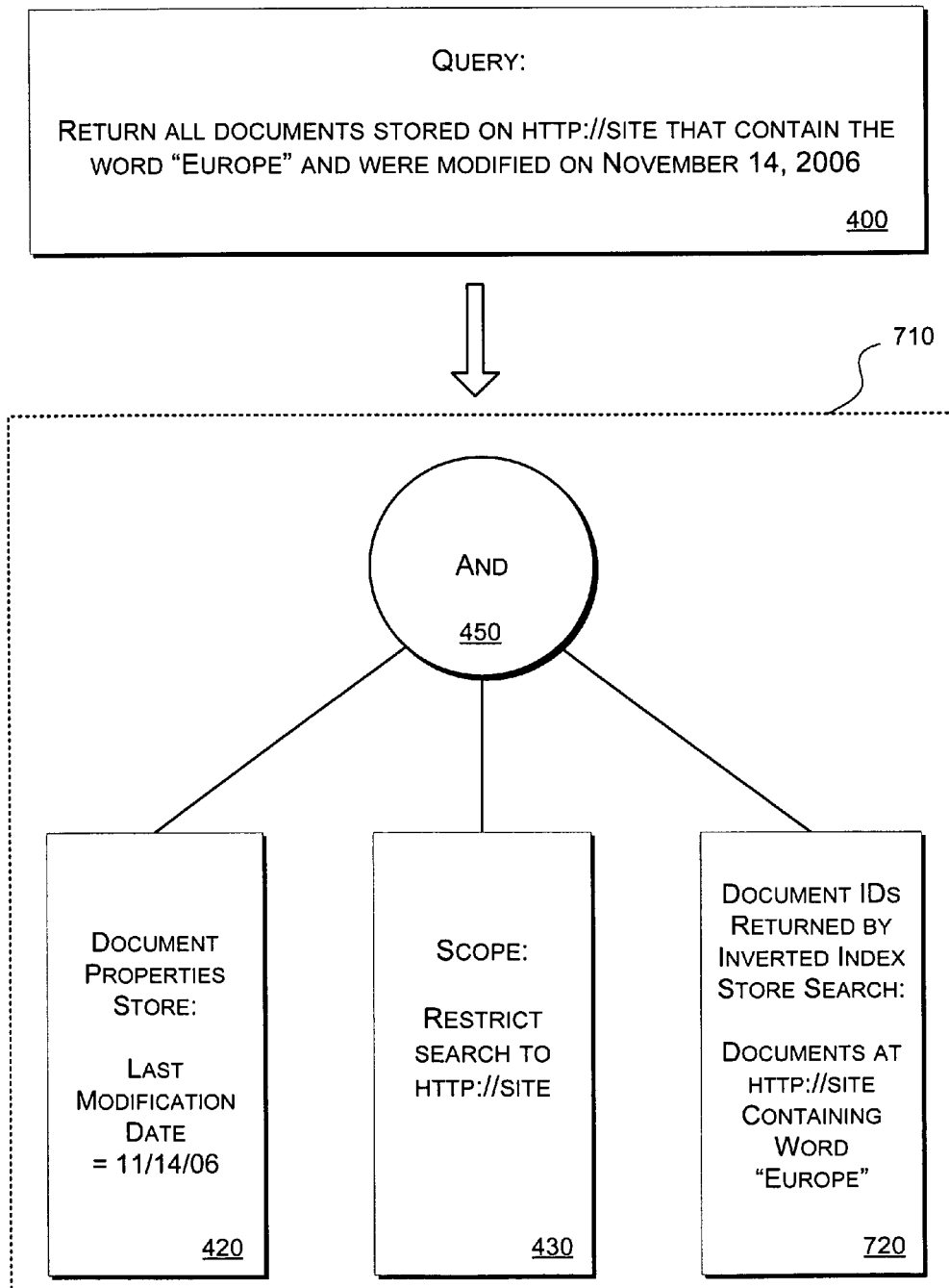

FIG. 7 shows another logical reconstitution 710 of the original query 400. In the reconstitution 710, the text-based subquery 520 was processed first to obtain a list of document identifiers 720 identifying documents within the scope restriction 430 that contained the word "Europe." Logically combining this list of document identifiers 720 with the document property store subquery 420 and the scope restriction 430 with a logical AND 450 is the same as the original query 400 or the first logical reconstitution 610 (FIG. 6) of the original query 400. Thus, batching the document identifiers resulting from the text-based subquery 720 to be combined with the document property store subquery 420 will trim the results at the text-based server without changing the overall result of original query 400.

Figure 8:
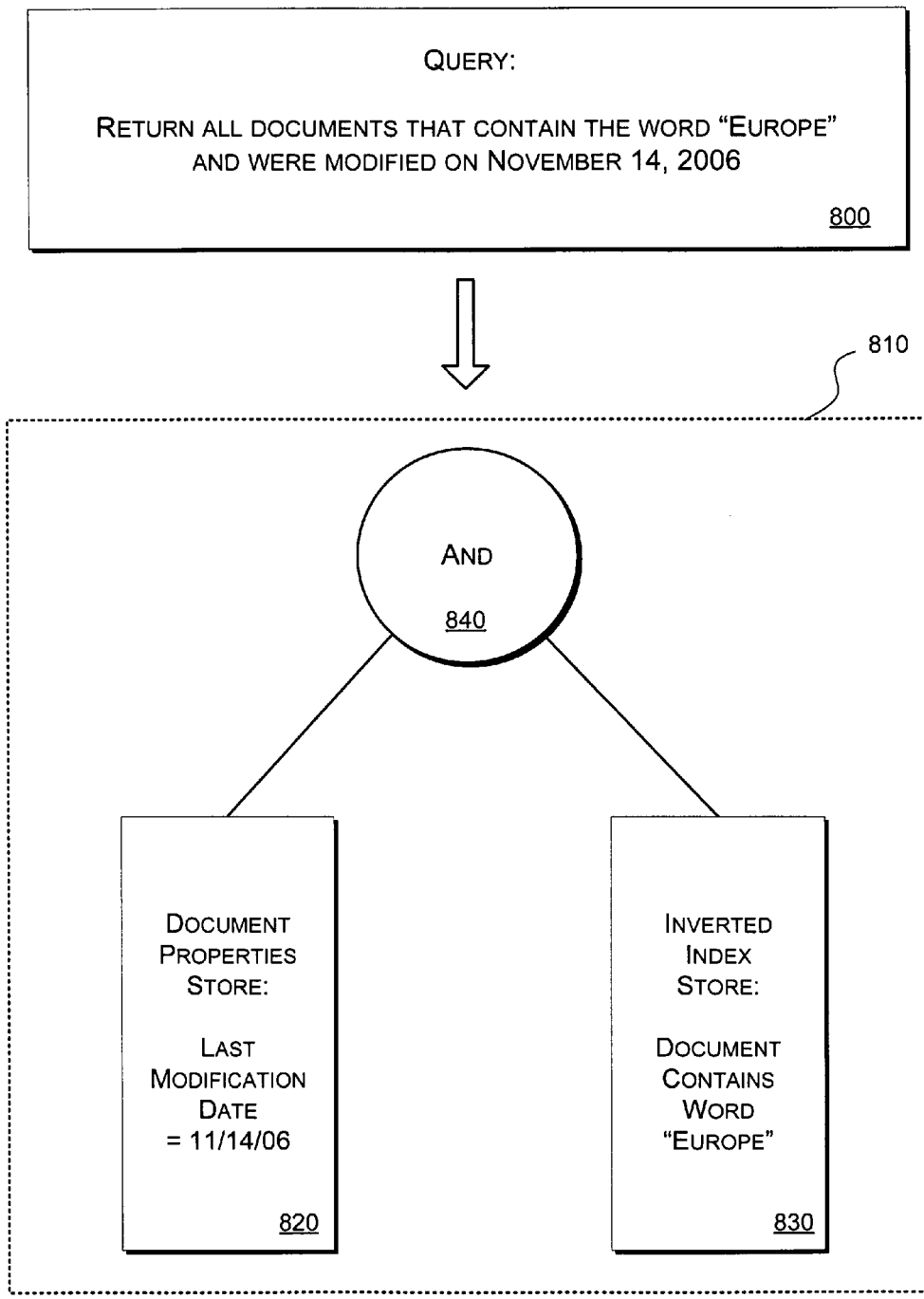
Figure 9:
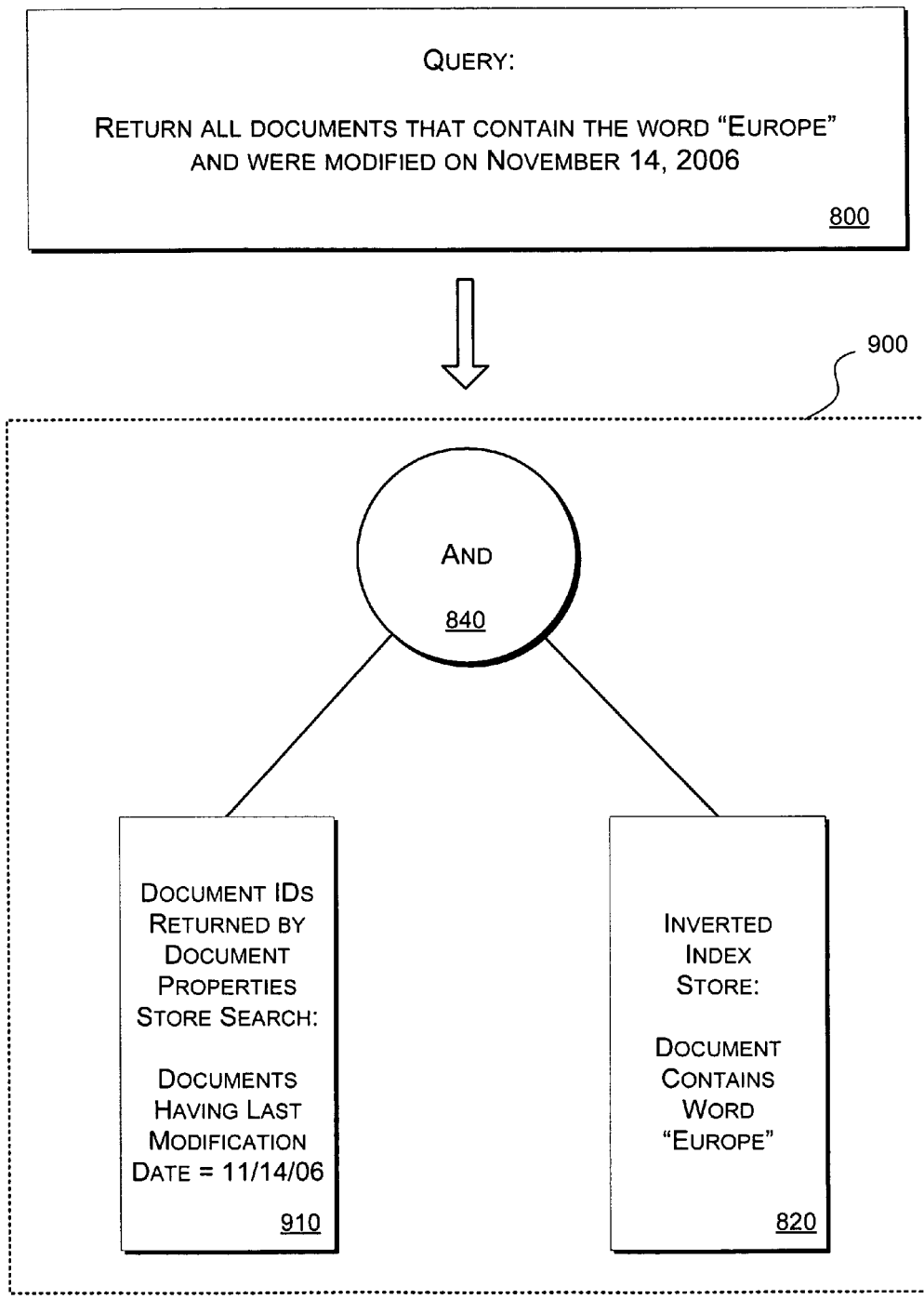
Figure 10:
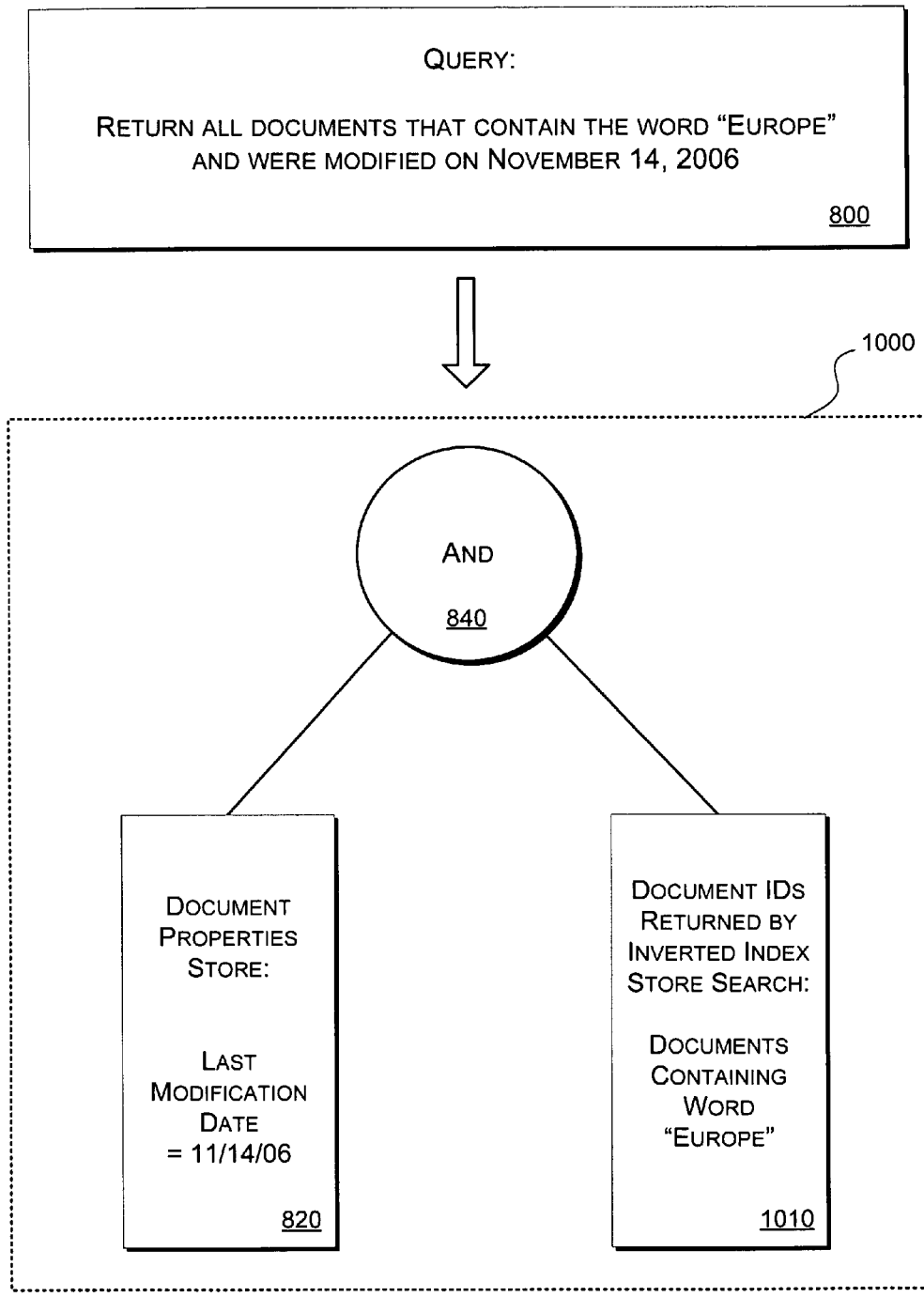

FIGS. 8-10 illustrate the processing of a simpler query 800 requesting "Return all documents that contain the word 'Europe' and were modified on Nov. 14, 2006." This query is similar to the query 400 (FIGS. 4-7), but without the scope restriction 430. The query 800 can be rewritten in a logical form 810 in which a document properties store subquery 820 seeking documents last modified on Nov. 14, 2006, is combined with an inverted index store subquery 830 seeking documents containing the word "Europe" with a logical AND 840. As shown in FIG. 9, once again, a logical reconstitution 900 of the query 800 formed by replacing the document property store subquery 820 with a batch of document identifiers 910 returned by processing the subquery 820 is logically the same as the logical representation 810 of the query 800. As shown in FIG. 10, another logical reconstitution 1000 of the query 800 formed by replacing the inverted index store subquery 830 with a batch of document identifiers 1010 returned by processing the subquery 830 is logically the same as the logical representation 810 of the query 800.

In sum, a masked subquery that includes a batch of document identifiers can be used to trim query results and efficiently process the query across multiple data stores. Regardless of the order in which the subqueries are processed, batching the document identifiers resulting from the processing of a first subquery and combining them with a second subquery to form a masked subquery returns the same results. However, by separating the query into subqueries and batching the document identifiers returned by a first subquery provides for flexibility in processing and the possibility of reducing processing loads and network communications traffic.

Flow Diagrams for Batching Document Identifiers to Process Queries

Figure 11:
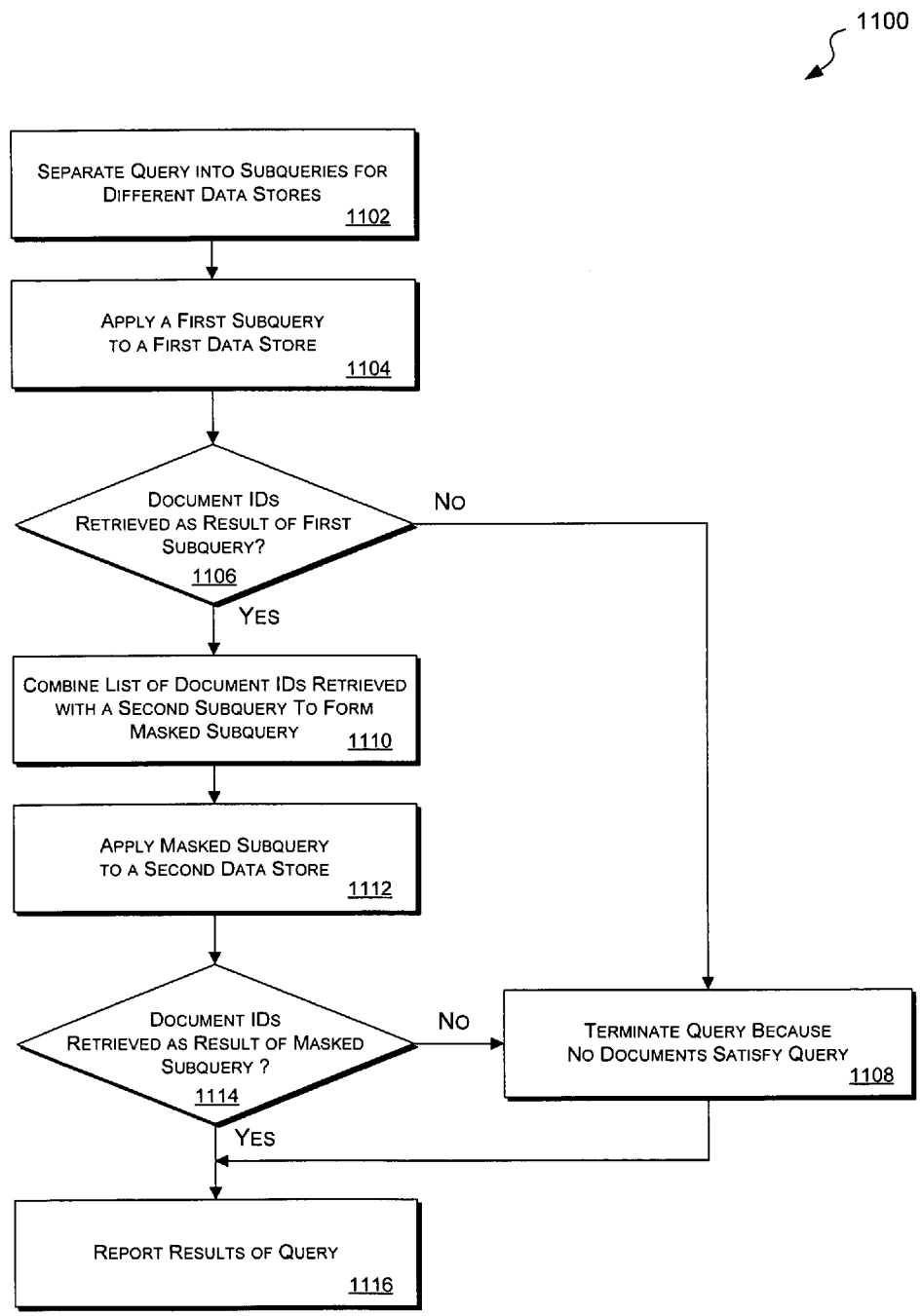
FIGS. 11-13 are flow diagrams of processes for processing queries using subqueries and lists of document identifiers.

Flow diagram 1100 of FIG. 11 illustrates a sequence of processing queries as previously described with reference to FIGS. 2 and 3. At 1102, a query is separated into subqueries to be applied to different data stores. If more than two data stores are involved in processing a query, the query could be separated into as many different subqueries as appropriate for retrieving information from the various data stores. Document identifiers retrieved in response to a subquery may be combined with the next subquery to reap the processing and communications advantages of result trimming as previously described. Nonetheless, for simplicity, FIGS. 11-14 illustrate examples in which a query is separated into first and second subqueries for use with two separate data stores.

At 1104, a first subquery is applied to a first data store. At 1106, it is determined if document identifiers have been retrieved as a result of processing the first subquery. If it is determined at 1106 that no document identifiers have been retrieved, flow diagram 1100 proceeds to 1108. If no document identifiers are retrieved as a result of the first subquery, at 1108, the query is terminated. If no document identifiers are retrieved in response to the first subquery, regardless how many document identifiers satisfy the second subquery, no documents will be found that satisfy both subqueries in order to satisfy the query as a whole. Accordingly, the query can be terminated without applying a second subquery to a second data store.

However, if it is determined at 1106 that a list of document identifiers has been retrieved as a result of the first subquery, at 1110, the list of document identifiers retrieved is combined with a second subquery to form a masked subquery. As previously described with reference to FIGS. 2-10, in one implementation, a list or batch of document identifiers is combined with the second subquery using a logical AND. At 1112, the masked subquery is applied to a second data store. At 1114, it is determined at the list of document identifiers has been retrieved as a result of processing the masked subquery. If not, at 1108 the query is terminated because no documents satisfy the query as a whole. In either case, whether or not processing of the masked subquery has resulted in the retrieval of document identifiers, at 1116, the results of the query are reported.

Figure 12:
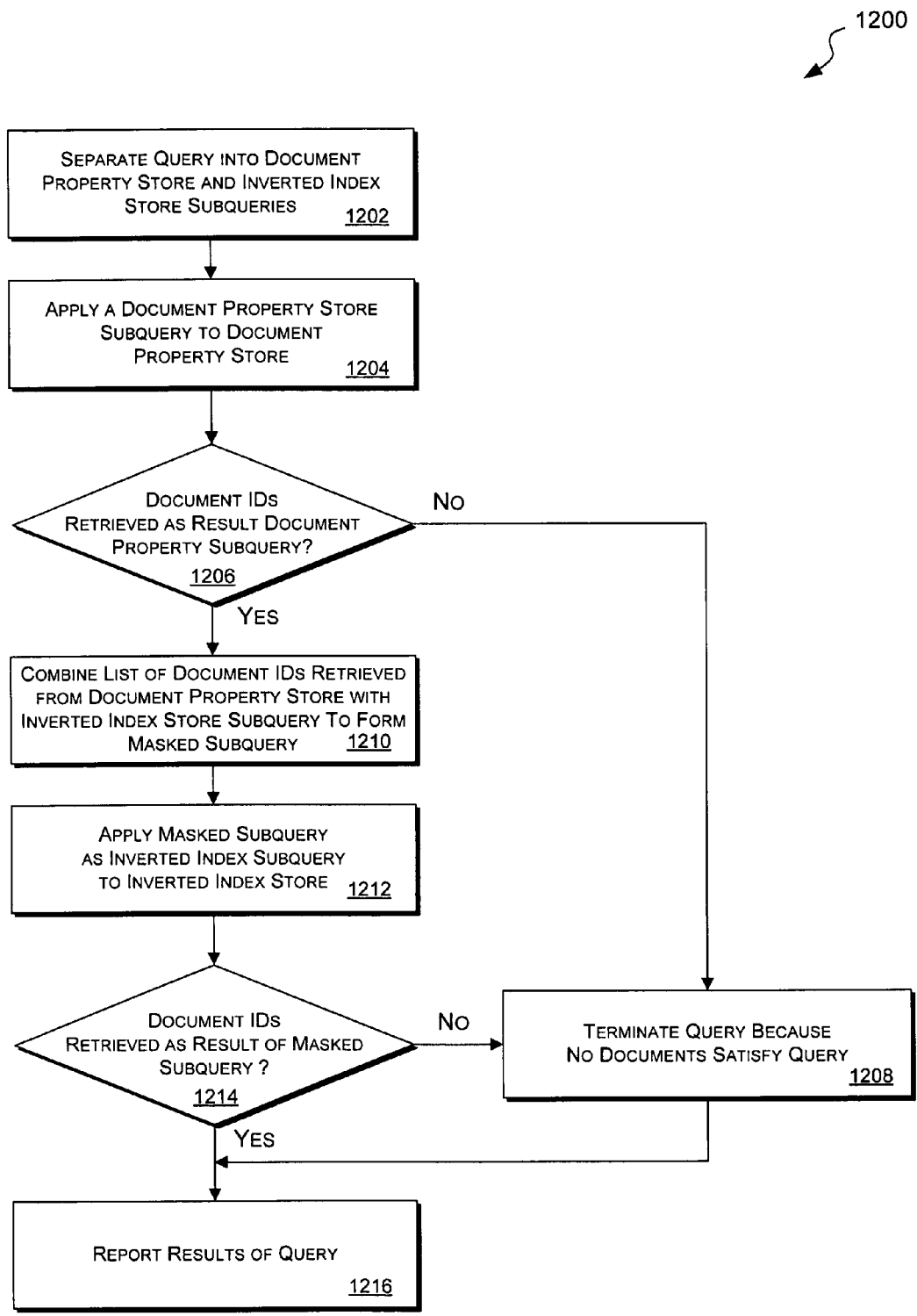

FIG. 12 provides a specific illustration the process 1100 illustrated in FIG. 11 where the document properties subquery is identified as a first subquery, either by default or according to a set of rules as described below with reference to FIGS. 13 and 14. At 1202, a query is separated into separate document property store and inverted index store subqueries. At 1204, the document property store subquery is applied to a document property data store. At 1206, it is determined if document identifiers have been retrieved as a result of processing the document property store subquery. If it is determined at 1206 that no document identifiers have been retrieved, flow diagram 1200 proceeds to 1208 and the query is terminated. If no document identifiers are retrieved in response to the document property store subquery, regardless how many document identifiers satisfy the inverted index store subquery, no documents will be found that satisfy both subqueries in order to satisfy the query as a whole. Accordingly, the query can be terminated without applying the inverted index store subquery to the inverted index data store.

However, if it is determined at 1206 that a list of document identifiers has been retrieved as a result of the document property store subquery, at 1210, the list of document identifiers retrieved is combined with the inverted index store subquery to form a masked subquery. As previously described with reference to FIG. 2, in one implementation, a list or batch of document identifiers retrieved by application of the document property store subquery is combined with the inverted index store subquery using a logical AND. At 1212, the masked subquery is applied to an inverted index data store. At 1214, it is determined at the list of document identifiers has been retrieved as a result of processing the masked subquery. If not, at 1208 the query is terminated because no documents satisfy the query as a whole. In either case, whether or not processing of the masked subquery has resulted in the retrieval of document identifiers, at 1216, the results of the query are reported.

As previously described, FIG. 12 illustrates a process 1200 in which the document property store subquery is the first subquery processed. One should two points. First, if for any reason it was desired that the inverted index store subquery should be applied as a first subquery, the process would be similar to the process 1200 of FIG. 12, merely reversing the order of which subquery was executed first and had its results combined with the other subquery.

Second, as described with reference to FIGS. 13 and 14, which subquery is performed first may be determined based on an analysis of the subqueries or the environment to determine which subquery might be more logically or efficiently executed before the other. There may be many valid reasons for determining when one subquery should be processed before another. For example, if one subquery could be expected to retrieve a list of fewer document identifiers, executing that subquery first would more significantly trim the number of document identifiers batched to another store to form the masked subquery. Processing that query first would reduce processing and network burdens, thus it may be desirable to process that subquery as a first subquery. In the alternative, to name just one example, processing loads or network traffic constraints may indicate that one part of a subquery directed to a more accessible data store should be processed as a first subquery. Seeking to maximize use of available resources also would be a logical reason to prioritize one subquery over another.

Figure 13:
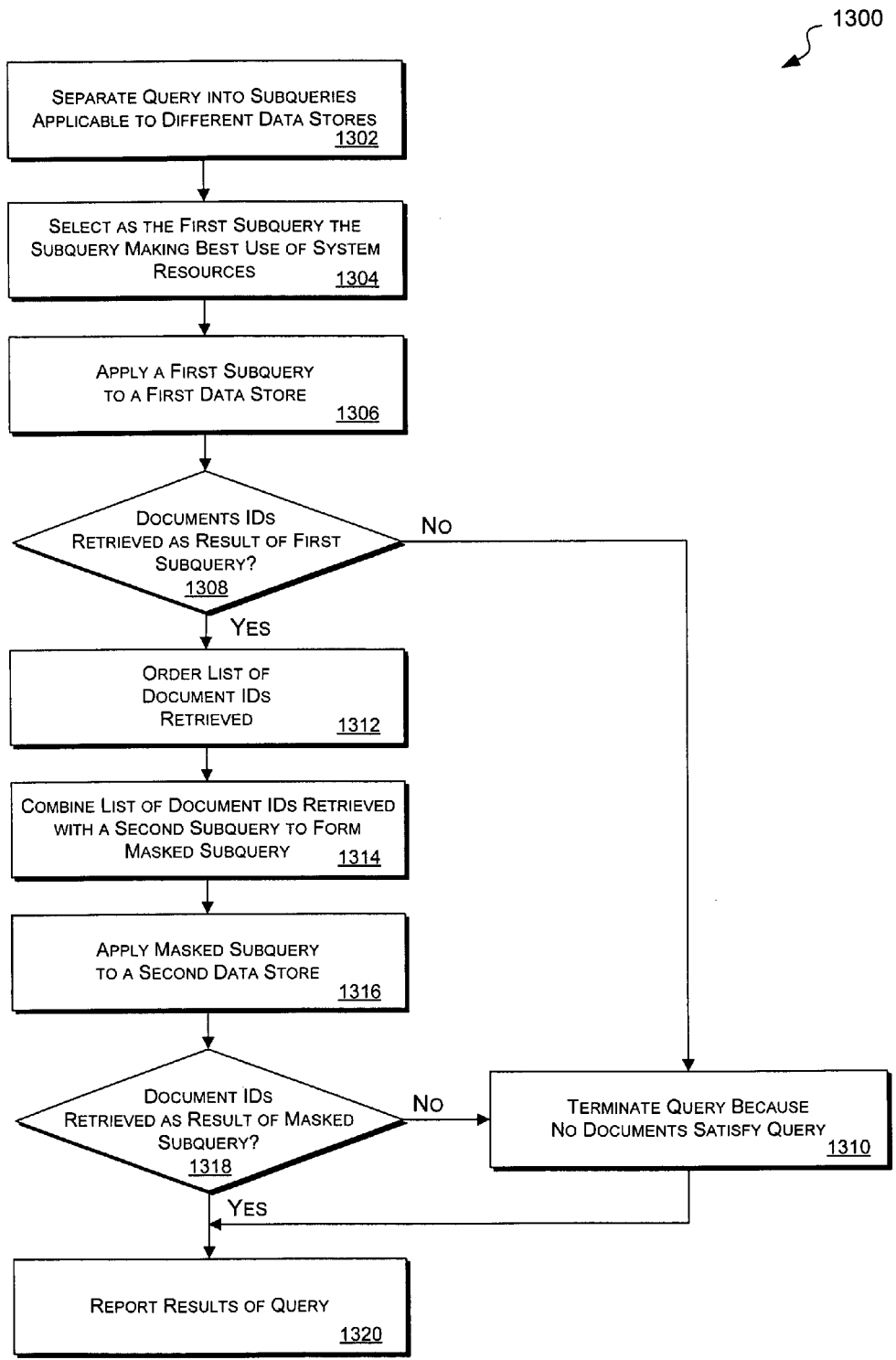

FIG. 13 illustrates one example of a process in which an assessment is made as to which subquery should be processed first. In flow diagram 1300 of FIG. 13, at 1302 a query is separated into subqueries for different data stores. A 1304, a subquery is selected as the first subquery on the basis of making the best use of system resources. An exemplary process for making such a selection is described below with reference to FIG. 14.

At 1306, a first subquery is applied to a first data store. At 1308, it is determined if document identifiers have been retrieved as a result of processing the first subquery. If it is determined at 1308 that no document identifiers have been retrieved, the flow diagram 1300 proceeds to 1310. If no document identifiers are retrieved as a result of the first subquery, at 1310, the query is terminated. Again, if no document identifiers satisfy the first subquery, no documents will be found that satisfy both subqueries and there is no reason to apply a second subquery to the second data store.

However, if it is determined at 1308 that a list of document identifiers has been retrieved as a result of the first subquery, at 1312 the list of document identifiers retrieved is placed in an order so as to match an order of document identifiers as they will be ordered in the second data store. Ordering the document identifiers thus can make the analysis of the document information in the second data store more efficient by facilitating a sequential analysis of the documents in the second data store. One should note that ordering the document identifiers can make the analysis of documents in a second data store more efficient regardless of whether a determination is made, such as at 1304, whether one subquery logically should be executed or applied before another subquery. It further should be noted that the document identifiers can be ordered within the data store that retrieved the document identifiers, in the data store where the document identifiers will be applied as part of a masked subquery, by a front-end query server, or by any other node within the network.

At 1314, a list or batch of document identifiers is combined with the second subquery using a logical AND. At 1316, the masked subquery is applied to a second data store. At 1318, it is determined at the list of document identifiers has been retrieved as a result of processing the masked subquery. If not, at 1310 the query is terminated because no documents satisfy the query as a whole. In either case, whether or not processing of the masked subquery has resulted in the retrieval of document identifiers, at 1320, the results of the query are reported.

Figure 14:
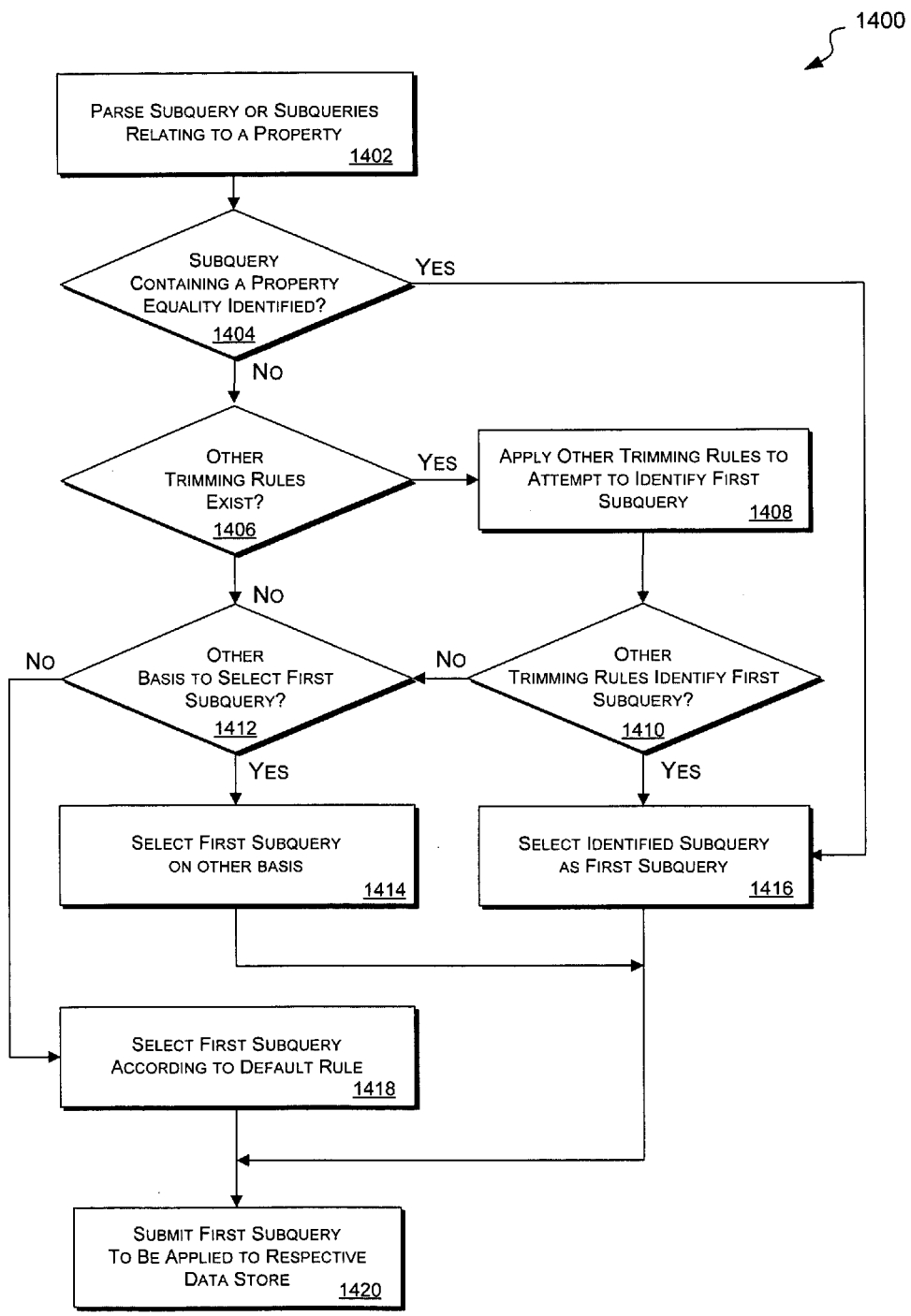
FIG. 14 is a flow diagram of a process for identifying a subquery that will return a list of fewer document identifiers to be used as a first subquery.

Flow diagram 1400 of FIG. 14 illustrates an exemplary process of selecting a subquery as a first subquery to efficiently use available resources. At 1402, one or more subqueries that relate to a document property are parsed. At 1404, it is determined whether there exists a subquery containing an equality involving a document property. In one implementation, it is assumed that a document property involving an equality may significantly trim the number of results that may be reasonably expected from the application of that subquery.

For example, if the document property is an author identifier, and there are dozens, hundreds, or thousands of authors in the body of documents, an equality identifying one or a few selected authors can be expected to greatly trim the results to relatively few document identifiers. By selecting such a subquery as a first subquery, subsequent processing can be greatly reduced because only portion of the next data store or data stores may have to be searched. In addition, by trimming the results significantly with the first subquery or subqueries, the number of subsequent document identifiers to be batched or otherwise communicated for combination with the next subquery or subqueries will be reduced, thereby reducing network traffic between the servers and data stores.

If it is determined at 1404 the subquery contains an equality to a document property, the flow diagram of 1400 proceeds to 1416 to select the identified subquery as the first subquery. On the other hand, if it is determined at 1404 that the subquery does not contain a document property equality, at 1406, it is determined whether other trimming rules exist. If so, at 1408 the other trimming rules are applied to attempt to identify the first subquery.

Other trimming rules, for example, may include inequalities that also will significantly trim the number of document identifiers. For instance, if a document properties store subquery requests all documents that satisfy some conditions and that were created within the past few days, and the database of documents includes years worth of documents, such an inequality would also significantly trim the list of document identifiers. Any appropriate rule or rules that make trim the number of document identifiers may be used. At 1410 it is determined whether these other trimming rules have succeeded in identifying an appropriate first subquery. If so, the flow diagram proceeds to 1416 to select the identified subquery as the first subquery.

On the other hand, it was determined at 1406 that no other trimming rules exist, at 1412, it is determined if there is another basis to select a first subquery. As previously described, for example, processing loads on different servers or data stores or network traffic between servers and data stores may indicate that a subquery that can be processed or communicated without delay should be selected as the first subquery. When it is determined at 1412 that another basis exists for selecting a first subquery, at 1414, the first subquery is selected according to this other basis.

However, if it is determined if at 1412 that there is no other basis to select the first subquery because, for example, the server and communications loads are equal, at 1418, the first subquery is selected according to a default rule. For example, when all other factors are equal, it may be more likely that a text-based subquery generally will identify fewer document identifiers. Alternatively, an assumption might be made that subqueries involving a document property may generally result in the retrieval of fewer document identifiers. Whatever default rule is selected, or whatever other selection rule is used to determine a first subquery, at 1420, the first subquery is submitted to be applied to its respective data store for processing.

FIG. 14 illustrates application of only one example of one specific rule to determine which subquery should be applied first: whether a subquery contains a document property equality at 1404. However, this is just one example of a term in a subquery that might usefully differentiate which of the subqueries might return fewer document identifiers and thereby better trim the query results. For another example, an inverted index query that seeks documents containing an exact phrase including five or more words or that seeks a document containing each of ten or more different words may be expected to return a list of relatively few document identifiers. Accordingly, such a rule could be used to determine whether to apply the inverted index store subquery first at 1404 of FIG. 14. Alternatively, such a rule could be another trimming rule applied at 1408. Any number of such differentiating, prioritizing rules could be implemented in a process such as that exemplified by process 1400 of FIG. 14.

Format of Query Messages

Figure 15:
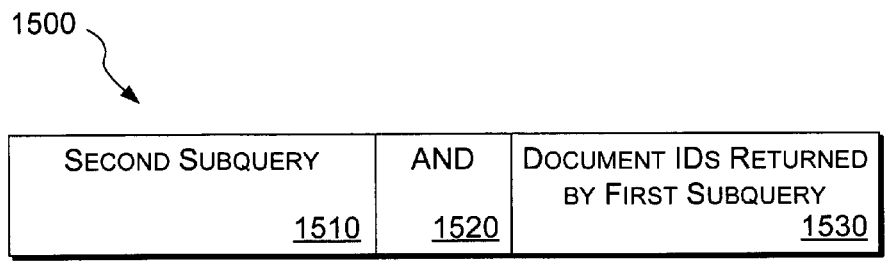
FIGS. 15-17 are logical block diagrams of query messages including document identifier nodes.
Figure 16:
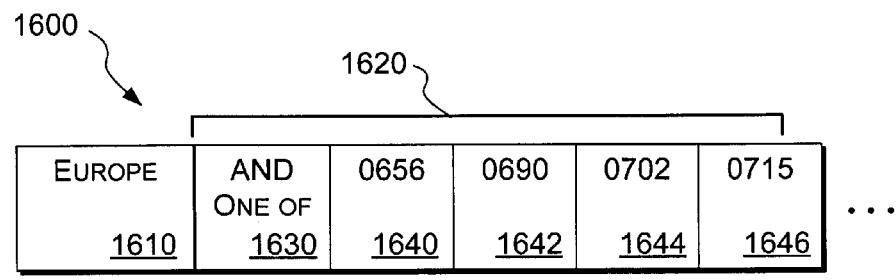
Figure 17:
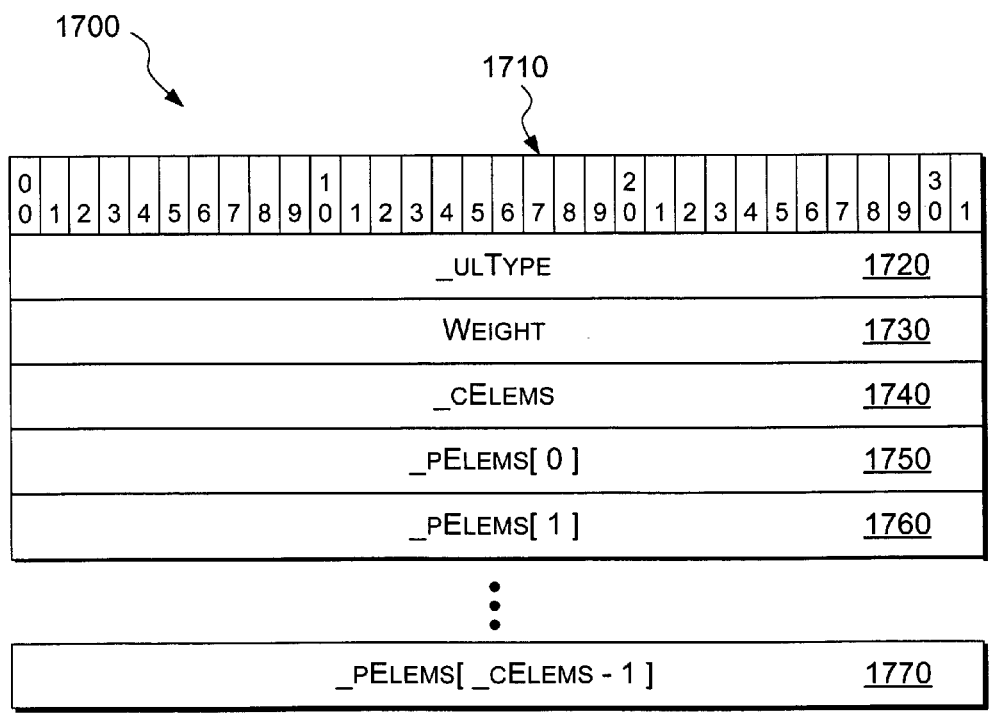

FIGS. 15-17 illustrates block diagrams of message query formats that might be used with implementations of document identifier determining methodologies. FIG. 15 illustrates a basic message query format 1500 depicting a logical structure from matching document identifiers along with a subquery. In foregoing examples, document identifiers retrieved by a subquery are combined with a subsequent subquery to trauma the query results. Consistent with the foregoing examples, the basic message query format 1500 includes a second subquery 1510 that is combined with a logical AND 1520 with a list of document identifiers returned by a first subquery 1530. Thus, the message query format 1500 communicates a masked subquery in which the document identifiers returned by a previous subquery are logically combined with a subsequent subquery to trim the results expected as compared with processing of the subsequent subquery by itself.

FIG. 16 presents a slightly more detailed query message format 1600 including two nodes 1610 and 1620 as would be applied to an inverted index store once a document property subquery already returned a list of document identifiers 1640-1646. A first node 1610 representing an inverted index store subquery specifies that desired documents include the word "Europe," as included in the foregoing sample queries 400 (FIGS. 4-7) and 800 (FIGS. 8-10). Node 1620 specifies a restriction type 1630. The restriction type 1630 node specifies "AND ONE OF" relative to the list of document identifiers 1640-1646 returned by the document property store subquery. The document identifiers 1640-1646 specify fixed format document identifiers. In this example, each identifier includes a four-digit number. The query message format 1600 specifies that the data store receiving the query should return the document identifiers for documents containing the word "Europe" within the subset of documents including documents designated by document identifiers 0656, 0690, 0702, 0716, etc.

FIG. 17 shows a detailed query message format 1700 that includes an extension to specify document identifiers. The query message format 1700 includes an extension applied to a named pipe protocol message, such as a content indexing service protocol (CISP) used to present queries to remote servers and data stores. This protocol, for example, is used by the Microsoft Windows® operating system produced by Microsoft Corporation of Redmond, Wash. in versions of Microsoft Windows® including Microsoft Windows® 2000 and later versions. Microsoft Windows® uses the protocol to communicate a query to a remote system. FIG. 17 illustrates a segment of a query message format 1700 in which each of the fields is a four-byte wide or 32-bit wide field 1710. However, the query message format 1700 may be implemented with other field widths, including 64-bit-wide fields, as well as fields of lesser and greater widths. The query message format 1700 is neither dependent upon nor limited to 32-bit-wide fields.

Those skilled in the art will recognize that a named pipe protocol message includes nodes having a restriction type or "_ulType" 1720 which is a four-byte or 32-bit unsigned integer indicating the restriction type. In applying an extension to the named pipe protocol, the restriction type is a document identifier restriction type. In effect, the document identifier restriction type may include the "AND ONE OF" restriction 1620 of FIG. 16.

Consistent with the named pipe protocol, the query message format includes a WEIGHT field 1730. The WEIGHT field 1730 is another four-byte or 32-bit unsigned integer representing the weight of the node. The WEIGHT field 1730 indicates the node's importance relative to other nodes in the query command tree. Typically, the higher the value of the WEIGHT field 1730, the more important the node is.

Part of the extension to the named pipe protocol is an elements or _cElems field 1740. This is part of the extension because, unlike typical fixed-length messages, to include a variable number of document identifiers, the query message format is modified to allow a variable number of document identifiers. However, to communicate the length of the query message and the number of document identifiers, the elements or _cElems field 1740 indicates the number of document identifiers following the elements or _cElems field 1740 in the query message 1700.

Finally, the query message format 1700 with the described extension includes a plurality of document identifiers or _pElems 1750, which, in this example, include _pElems[0] 1750, _pElems[1] 1760, through _pElems [_cElems-1] 1770. As previously described, this list or batch of document identifiers represents the mask included in a masked subquery that affects the trimming of results from an associated subquery. As previously described, in a preferred implementation, the document identifiers 1750-1770 are presented in the order in which the document identifiers will be listed in the next data store to facilitate efficient searching of the data store. The following code defines this new data structure applied as an extension to the named pipe protocol:

```
class CDocSetRestriction : public CRestriction
{
    // ...
private:
    XArray< WORKID > _aWorkIds; // sorted
};
template <class T> class XArray
{
private:
    T *     _pElems;
    unsigned _cElems;
};
```

The protocol extension manifested in FIG. 17 illustrates a protocol extension applied in preparing a masked subquery combining an inverted index store subquery with a list of document identifiers retrieved in applying a document property store subquery to a document property store. The protocol extension may be similarly applicable to a case in which the inverted index store subquery is applied as the first subquery. However, it should be noted that, when the inverted index store subquery is applied as the first subquery and the document property store is an SQL database, the masked subquery could be formed by including the document identifiers retrieved in applying the first subquery by including the document identifiers as terms in an SQL query.

Forming Query Messages

Figure 18:
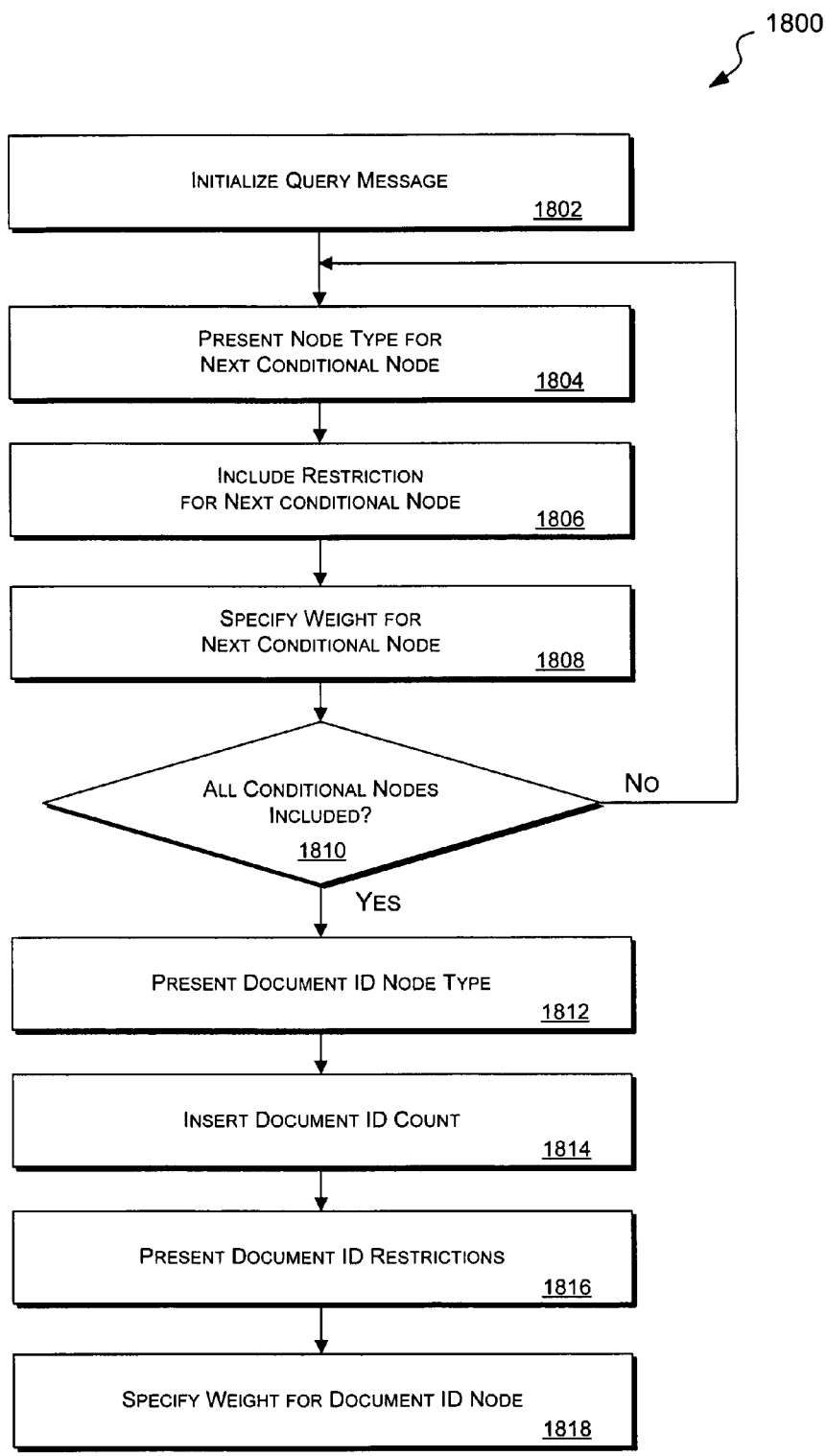
FIG. 18 is a flow diagram of a process for forming a variable length query message including document identifier restrictions.

Flow diagram 1800 of FIG. 18 describes a process of forming a query message with the extension herein described to include document identifiers. At 1802, the query message is initialized, such as by forming the appropriate header block. At 1804, the node type for the next conditional node is indicated, whether that node is a logical AND node type or a new document identifier type. At 1806, the restriction is included for the next conditional node. For example, if the node type was a full-text-based node, the restriction would be the word or phrase sought by the query. In a document properties example, it might be the author's name or the date of last modification. At 1808, consistent with the named pipe protocol, a weight is specified for the next conditional node.

At 1810, it is determined if all the conditional nodes, such as the full-test-based or document properties nodes have been formed. If not, the flow diagram 1800 proceeds to 1804 to present the node type for the next type of node.

On the other hand, if it is determined at 1810 that all the conditional nodes have been included, at 1812, the document identifier node is introduced by presenting the document identifier node type 1812. At 1814, as previously described with reference to FIG. 17, the document identifier count is presented to indicate how many document identifiers are included in the query message. At 1816, the document identifier restrictions are inserted in the query message to identify the document identifiers to be used to restrict or mask the documents being retrieved by the query to those documents associated with the document identifier restrictions listed. At 1818, consistent with the named pipe protocol, the weight for the document identifier node is specified.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for forming a message to communicate a query to a data store to selectively identify documents from a data store that maintains information on each of a plurality of documents including an associated document identifier and associated descriptive information, the method comprising:

transmitting from a first computing device a first subquery to retrieve a plurality of document identifiers from a first data store;

generating a masked subquery by combining the plurality of document identifiers with at least one condition, the generation of the masked subquery including:

specifying the at least one condition the associated descriptive information must satisfy for each of the plurality of documents to be identified by the masked subquery;

specifying a document identifier list including the plurality of document identifiers restricting the masked subquery, the document identifier list comprising:

a restriction type indicating a restriction satisfied when a property value is equal to any one entry in the document identifier list;

a plurality of document restrictions, each of the document restrictions including a document identifier within the plurality of document identifiers; and a document restriction count specifying a number of document restrictions included in the document identifier list;

transmitting from the first computing device the masked subquery via a named pipe protocol to a second data store;

receiving results of the masked subquery such that only documents having associated descriptive information satisfying the at least one condition and having an associated document identifier included in the document identifier list are selectively identified by the masked subquery and retrieved from the second data store.

2. The computer-implemented method of claim 1, wherein specifying the at least one condition comprises:
- at least one restriction that selectively identifies documents according to the information maintained by the second data store; and
- a node type indicating how the restriction is to be applied to the information to specify a condition a document must satisfy to be selectively identified by the masked subquery.

3. The computer-implemented method of claim 1, further comprising ordering the document identifiers to present the document identifiers in an order in which the document identifiers in the second data store are ordered.

4. A computer-readable storage medium having computer-executable instructions that when executed perform a method for assembling a plurality of nodes to present a query message to a data store to selectively identify a portion of a plurality of documents for which the data store maintains an associated document identifier and associated descriptive information for each of the plurality of documents, the method comprising:
- retrieving a plurality of document identifiers;
- generating the query message by:
- presenting at least one conditional node within the query including:
  - a restriction operable to selectively identify documents according to the information maintained by the data store; and
  - a node type indicating how the restriction is to be applied to the information to specify a condition a document must satisfy to be selectively identified by the query; and
- presenting at least one document identifier node including:
  - a plurality of document identifier restrictions identifying the retrieved plurality of document identifiers;
  - a document identifier node type indicating that the query will selectively identify only those documents for which the condition is satisfied by the associated descriptive information and for which the associated document identifier is included among the plurality of document identifier restrictions;
  - a document identifier count specifying a number of document identifier restrictions included in the document identifier node;
- transmitting from the first computing device the query via a named pipe protocol to the data store;
- receiving results of the query such that only documents having associated descriptive information satisfying the at least one conditional node and having an associated one of the retrieved plurality of document identifier included in the at least one document identifier node are selectively identified by the query and retrieved from the data store.

5. The computer-readable storage medium of claim 4, wherein each of the nodes further comprises a weight indicating an importance of the node relative to other nodes included in the query message.

6. The computer-readable storage medium of claim 4, wherein the query message is a variable length message.

7. The computer-readable storage medium of claim 4, further comprising ordering the plurality of document identifier restrictions to present the document identifier restrictions in an order in which the document identifiers in the data store are ordered.

8. A computer system for forming a message to communicate a query to a data store to selectively identify documents from a data store that maintains information on each of a plurality of documents including an associated document identifier and associated descriptive information, the computer system comprising:
- one or more processors for executing computer executable instructions; and
- one or more computer storage media storing the computer executable instructions that when executed by the one or more processors perform a method comprising:
  - transmitting from a first computing device a first subquery to retrieve a plurality of document identifiers from a first data store;
  - generating a masked subquery by combining the plurality of document identifiers with at least one condition, the generation of the masked subquery including:
    - specifying the at least one condition the associated descriptive information must satisfy for each of the plurality of documents to be identified by the masked subquery;
    - specifying a document identifier list including the plurality of document identifiers restricting the masked subquery, the document identifier list comprising:
      - a restriction type indicating a restriction satisfied when a property value is equal to any one entry in the document identifier list;
      - a plurality of document restrictions, each of the document restrictions including a document identifier within the plurality of document identifiers; and
      - a document restriction count specifying a number of document restrictions included in the document identifier list;
  - transmitting from the first computing device the masked subquery via a named pipe protocol to a second data store;
  - receiving results of the masked subquery such that only documents having associated descriptive information satisfying the at least one condition and having an associated document identifier included in the document identifier list are selectively identified by the masked subquery and retrieved from the second data store.

9. The computer system of claim 8, wherein specifying the at least one condition comprises:
- at least one restriction that selectively identifies documents according to the information maintained by the second data store; and
- a node type indicating how the restriction is to be applied to the information to specify a condition a document must satisfy to be selectively identified by the masked subquery.

* * * * *